United States Patent [19]
Chun et al.

[11] 3,957,619
[45] May 18, 1976

[54] PROCESS FOR THE CONVERSION OF CARBONACEOUS MATERIALS

[75] Inventors: Sun W. Chun, Murrysville; Donald C. Cronauer, Gibsonia; Thomas W. Leslie, Blawnox, all of Pa.

[73] Assignee: Gulf Research & Development Company, Pittsburgh, Pa.

[22] Filed: June 24, 1974

[21] Appl. No.: 482,077

Related U.S. Application Data

[60] Continuation-in-part of Ser. No. 441,604, Feb. 11, 1974, abandoned, which is a division of Ser. No. 226,503, Feb. 15, 1972, abandoned.

[52] U.S. Cl. ................................ 208/10; 23/288 R
[51] Int. Cl.² ............................................ C10G 1/06
[58] Field of Search ............ 208/143, 144, 146, 10; 23/288 R

[56] References Cited
UNITED STATES PATENTS

| | | | |
|---|---|---|---|
| 1,934,023 | 11/1933 | Wright | 208/10 |
| 2,108,087 | 2/1938 | Thayer | 23/288 R |
| 2,181,153 | 11/1939 | Prickett | 23/288 R |
| 2,245,145 | 6/1941 | Hall et al. | 23/288 R |
| 2,257,178 | 9/1941 | Martin et al. | 208/146 |
| 2,276,340 | 3/1942 | Prickett et al. | 23/288 R |
| 2,288,943 | 7/1942 | Eastman | 23/288 F |
| 2,338,063 | 12/1943 | Simpson et al. | 208/146 |
| 3,092,674 | 6/1963 | Bray et al. | 260/680 R |
| 3,477,833 | 11/1969 | McMullin et al. | 23/288 R |
| 3,509,043 | 4/1970 | McMaster et al. | 208/146 |
| 3,707,831 | 1/1973 | Dantzenberg et al. | 23/288 F |
| 3,796,655 | 3/1974 | Armistead | 208/216 |

*Primary Examiner*—Delbert E. Gantz
*Assistant Examiner*—James W. Hellwege

[57] ABSTRACT

A process is provided for the conversion (including upgrading) of solid carbonaceous materials, and in particular for the hydrogenation of coal slurries. The process comprises passing a slurry composed of solid carbonaceous material and solvent, together with hydrogen, through a reaction vessel that contains a plurality of reaction zones separated by porous partitions. A portion of said zones is adapted to contain a solid particulate hydrogenation catalyst which will not pass through said porous partitions. The remainder of said zones forms substantially unobstructed passageways through said reaction vessel. The volumetric proportion of substantially unobstructed passageways to catalyst zones is preferably from about 20:1 to about 1:10.

29 Claims, 8 Drawing Figures

PROCESS FOR THE CONVERSION OF CARBONACEOUS MATERIALS

This application is a continuation-in-part application of our U.S. application Ser. No. 441,604, filed Feb. 11, 1974 now abandoned entitled PROCESS AND APPARATUS FOR THE CONVERSION OF CARBONACEOUS MATERIALS, the latter being a division of our U.S. application Ser. No. 226,503 now abandoned bearing the same title, filed Feb. 15, 1972.

This invention relates to an improved process for the conversion (including upgrading) of carbonaceous materials that are substantially solid at room temperature, particularly coal, to give an improved product, particularly an improved liquid product. The invention relates especially to an improved process for hydrogenating solid carbonaceous materials which tend to form deposits such as coke and/or ash during conversion. The term "conversion" includes processes wherein a solid carbonaceous material, essentially hydrocarbon in nature, as defined herein, is changed in accordance with the process defined and claimed herein, physically and/or chemically, to another distinct species, as, for example, the change that occurs as a result of the hydrogenation of coal to a liquid. The term "upgrading" includes processes wherein treatment of the solid carbonaceous material results in a product having enhanced physical and/or chemical properties, as, for example, wherein some of the solid carbonaceous material is not liquefied during processing but has a lower ash content and is lower in sulfur or nitrogen and/or wherein the liquid obtained is lower in sulfur or nitrogen content.

The treatment of solid carbonaceous materials, especially finely-comminuted solid carbonaceous materials, such as coal, to produce upgraded products has been under study for many years. Since coal reserves represent one of the largest sources of energy supply in the world, much attention has been directed to devising and developing processes for conversion and/or upgrading coal. Efforts have been directed, for example, to thermally treating coal slurries to produce upgraded products. While the thermal treatment of coal slurries has resulted in the production of some upgraded products, certain undesirable characteristics are encountered in conventional thermal processes. One undesirable characteristic encountered in a thermal process is the low yield of liquid product. Conventional thermal treatment, for example, of coal results not only in a low yield of liquid product but also in a liquid product of low quality. Difficulty has also been encountered in filtering ash and unreacted coal from the viscous liquid products obtained in thermally treating coal slurries. While attempts have been made to upgrade and/or improve the yield of desirable liquid products by contacting the thermally-obtained viscous liquid products containing small amounts of ash and unreacted coal with a catalyst in an ebullating bed reactor, the products from the ebullating bed reactor similarly contain ash, solid coal and, in addition, solid catalytic material which is entrained in the liquid product. Again, difficulty is encountered in separating these solids from the desirable improved products. Further attempts have been made to improve coal treating processes by eliminating the initial thermal treatment. In such instances, the coal slurry without prior treatment is introduced into a catalyst-containing ebullating bed reactor. Similar separating problems are encountered in a catalyst-containing ebullating bed reactor, but, perhaps the most serious problem is the removal and recovery of catalyst and catalyst fines from the resulting product stream and solid ash-containing stream.

Fixed-bed reactors have been developed to avoid the attrition and catalyst recovery problems encountered with the ebullating bed reactor, but, because of the normal tendency of carbonaceous materials to form deposits upon conversion, most fixed-bed reactors tend to plug very quickly, creating pressure drops far greater than can be tolerated in commercially attractive catalytic conversion processes.

In accordance with the present invention, an improved process is provided for the conversion of solid carbonaceous materials normally tending to form deposits such as coke and/or ash during the conversion of said carbonaceous materials which comprises passing a slurry composed of said carbonaceous material and solvent, together with hydrogen, into contact with a plurality of closely-spaced, preferably elongated, reaction zones separated by porous partitions, a portion of said zones being adapted to contain a solid particulate catalyst which will not pass through said porous partitions and the remainder of said zones forming substantially unobstructed passageways through said reaction vessel, the volume proportion of substantially unobstructed passageways to catalyst zones being preferably from about 20:1 to about 1:10. The porous partitions are walls which separate the catalyst-containing zones from the unobstructed, catalyst-free zones, the openings in said walls being of such size that liquid passes through them while the catalyst particles will not pass through them. Depending on the particulate size of the solid carbonaceous material being treated at any particular time, some of it, too, can move in and out of said openings.

The process defined and claimed herein can be carried out over prolonged periods of time without plugging the catalyst beds and yet the conversion obtained is substantially comparable to those obtained in the conventional fixed-bed operation. In particular, operation in accordance with the process of this invention results in an improved process for the hydrogenation of solid carbonaceous materials over prolonged periods of time to produce improved yields of high quality products while simultaneously avoiding an excessive pressure drop in the reaction vessel.

The process of the invention, in a particularly preferred embodiment, in general, comprises blending the carbonaceous material, finely ground, with a solvent to form a slurry. The slurry is then introduced, together with hydrogen, into the reaction vessel described more fully hereinbelow. The reaction vessel contains a conventional hydrogenation catalyst and is maintained under normal hydrogenating pressures and temperatures. The slurry is passed through the reaction vessel in unobstructed passageways and under conditions such that the solvent and some of the solid carbonaceous material that may be small enough passes in and out of catalyst segments which are, preferably, parallel to the flow of slurry. After hydrogenation, solids that are present can be removed from the product stream. The product stream is then stripped of solvent, the amount of the solvent so stripped being sufficient for recycle purposes for blending with additional amounts of carbonaceous material to form a slurry. The balance of the product stream, not recycled, may thereafter by subjected to distillation to obtain products of various boiling ranges. Some of the products are useful per se as fuels. The remainder can be further treated by conventional petroleum processes including cracking, hydrocracking, hydrotreating, and the like.

In an especially preferred embodiment of the invention, the slurry of solid carbonaceous material and solvent is predigested with hydrogen in the absence of catalyst at pressure lower than that employed during the catalytic hydrogenation. The hydrogen predigestion pressure, however, can be essentially the same or greater than that employed during subsequent catalytic hydrogenation. A pressure within the range of about 100 to about 5000 pounds per square inch gauge (psig) is preferred. The temperature employed during predigestion is essentially the same as that employed during catalytic hydrogenation, i.e., about 500° to about 900° F. The rate at which hydrogen is charged during predigestion of the slurry is usually lower than that employed during subsequent catalytic hydrogenation but is at least sufficient to maintain the desired pressure. However, the amount of hydrogen charged can be essentially the same or greater than that employed in the catalytic hydrogenation. A preferred rate of hydrogen addition during predigestion is about 1000 to about 5000 standard cubic feet (SCF) per barrel of carbonaceous charge stock slurry. The rate at which slurry is charged during predigestion may be essentially the same as that employed during the catalytic hydrogenation. However, the slurry rate during predigestion can be less than or greater than that employed during catalytic hydrogenation. The space velocity in the predigestion vessel can be about 0.1 to about 10.0 volumes of slurry per hour per volume of predigestion vessel (VHSV). The predigested slurry is thereafter used as charge stock to the reaction vessel.

The solid carbonaceous materials that can be used herein can have the following composition on a moisture-free basis:

|  | Weight Per Cent | |
|---|---|---|
|  | Broad Range | Normal Range |
| Carbon | 45 – 95 | 60 – 92 |
| Hydrogen | 2.5 – 7.0 | 4.0 – 6.0 |
| Oxygen | 2.0 – 45 | 3.0 – 25 |
| Nitrogen | 0.75 – 2.5 | 0.75 – 2.5 |
| Sulfur | 0.3 – 10 | 0.5 – 6.0 |

The carbon and hydrogen content of the carbonaceous material will reside primarily in benzene compounds, multi-ring aromatic compounds, heterocyclic compounds, etc. Oxygen and nitrogen are believed to be present primarily in chemical combination with the aromatic compounds. Some of the sulfur is believed to be present in chemical combination with the aromatic compounds and some in chemical combination with inorganic elements associated therewith, for example, iron and calcium.

In addition to the above, the solid carbonaceous material being treated herein may also contain solid, primarily inorganic, compounds which will not be convertible to liquid product herein, which are termed as "ash", and are composed chiefly of compounds of silicon, aluminum, iron and calcium, with smaller amounts of compounds of magnesium, titanium, sodium and potassium. The ash content of a carbonaceous material treated herein will amount to less then 50 weight per cent, based on the weight of the moisture-free carbonaceous material, but in general will amount to about 0.1 to about 30 weight percent, usually about 0.5 to about 20 weight percent.

Anthracitic, bituminous and subbituminous coal, lignitic materials, and other types of coal products referred to in ASTM D-388 are exemplary of the solid carbonaceous materials which can be treated in accordance with the process of the present invention to produce upgraded products therefrom. When a raw coal is employed in the process of the invention, most efficient results are obtained when the coal has a dry fixed carbon content which does not exceed 86 percent and a dry volatile matter content of at least 14 percent by weight as determined on an ash-free basis. The coal, prior to use in the process of the invention, is preferably ground in a suitable attrition machine, such as a hammermill, to a size such that at least 50 percent cent of the coal will pass through a 40-mesh (U.S. Series) sieve. The ground coal is then dissolved or slurried in a suitable solvent. If desired, the solid carbonaceous material can be treated, prior to reaction herein, using any conventional means known in the art, to remove therefrom any materials forming a part thereof that will not be converted to liquid herein under the conditions of reaction.

Any liquid compound, or mixtures of such compounds, having hydrogen transfer properties can be used as solvent herein. However, liquid aromatic hydrocarbons are preferred. By "hydrogen transfer properties" we mean that such compound can, under the conditions of reaction herein absorb or otherwise take on hydrogen and also release the same. A solvent found particularly useful as a startup solvent is anthracene oil defined in Chambers's Technical Dictionary, MacMillan, Great Britain 1943, page 40, as follows: "A coal-tar fraction boiling above 518° F., consisting of anthracene, phenanthrene, chrysene, carbazole and other hydrocarbon oils." Other solvents which can be satisfactorily employed are those which are commonly used in the Pott-Broche process. Examples of these are polynuclear aromatic hydrocarbons such as naphthalene and chrysene and their hydrogenated products such as tetralin (tetrahydronaphthalene), decalin, etc. or one or more of the foregoing in admixture with a phenolic compound such as phenol or cresol.

The selection of a specific solvent when the process of the present invention is initiated is not critical since a liquid fraction which is obtained during the defined conversion process serves as a particularly good solvent for the solid carbonaceous material. The liquid fraction which is useful as a solvent for the solid carbonaceous material, particularly coal, and which is formed during the process, is produced in a quantity which is more than sufficient to replace any solvent that is converted to other products or which is lost during the process. Thus, a portion of the liquid product which is formed in the process of the invention is advantageously recycled to the beginning of the process. It will be recognized that as the process continues, the solvent used initially becomes increasingly diluted with recycle solvent until the solvent used initially is no longer distinguishable from the recycle solvent. If the process is operated on a semicontinuous basis, the solvent which is employed at the beginning of each new period may be that which has been obtained from a previous operation. For example, liquids produced from coal in accordance with the present invention are aromatic and generally have a boiling range of about 300° to about 1400° F., a density of about 0.9 to about 1.1 and a carbon to hydrogen mol ratio in the range of about 1.3:1 to about 0.66:1. A solvent oil obtained from a subbituminous coal, such as Wyoming-Montana coal, comprises a middle oil having a typical boiling range of about 375° to about 675° F. Thus, the solvent that is employed herein can broadly be defined as that obtained from a previous conversion of a carbonaceous solid material in accordance with the process defined herein. Although we have used the term "solvent", it is understood that such term covers the liquid wherein the liquid product obtained herein is dissolved as well as the liquid in which the solid materials are dispersed.

The ratio of solvent to solid carbonaceous material can be varied so long as a sufficient amount of solvent is employed to effect dissolution of substantially all of the solid carbonaceous material in the reaction vessel. While the weight ratio of solvent to solid carbonaceous material can be within the range of about 0.6:1 to about 4:1, a range of about 1:1 to about 3:1 is preferred. Best results are obtained when the weight ratio of solvent to solid carbonaceous material is about 2:1. Ratios of solvent to solid carbonaceous material greater than about 4:1 can be used but provide little significant functional advantage in dissolving or slurrying the solid carbonaceous material for use in the process of this invention. An excessive amount of solvent is undesirable in that added energy or work is required for subsequent separation of the solvent from the system.

In accordance with the present invention, the slurry and hydrogen are maintained at a temperature between about 500° and about 900° F., at a pressure between about 500 and about 10,000 pounds per square inch gauge (psig), and preferably at a pressure between about 1500 and about 4000 psig, utilizing a weight hourly space velocity (WHSV) between about 0.25 and about 50 pounds of solid carbonaceous material per pound of catalyst per hour, and added hydrogen in amount between about 2000 and about 20,000 standard cubic feet (SCF) per barrel of slurry. The exact conditions selected will depend, for example, upon the catalyst, the particular charge stock to be treated, and the degree of conversion desired. It is desirable to utilize as low a temperature as possible and still obtain the desired results. This is due to the fact that the degree of activation or promotion of some hydrogenation catalysts becomes more pronounced at the lower reaction temperatures. The hydrogen recycle rate does not vary significantly with various charge stocks and preferably should be between about 2000 and about 10,000 standard cubic feet per barrel of slurry.

Any hydrogenation catalyst well-known to those having ordinary skill in the art can be employed herein, but preferably the catalyst which is employed in the process of the invention comprises at least one hydrogenating component selected from the group consisting of the metals, metal sulfides and/or metal oxides of (a) a combination of about 2 to about 25 percent (preferably about 4 to about 16 percent) by weight molybdenum and at least two iron group metals where the iron group metals are present in such amounts that the atomic ratio of each iron group metal with respect to molybdenum is less than about 0.4 and (b) a combination of about 5 to about 40 percent (preferably about 10 to about 25 percent) by weight of nickel and tungsten where the atomic ratio of tungsten to nickel is about 1:0.1 to 5 (preferably about 1:0.3 to about 4), said hydrogenating component being composited with a porous support. Particularly preferred among the hydrogenating metals are nickel, cobalt, molybdenum and tungsten. Catalysts of type "(a)" may contain molybdenum in the amounts conventionally used, i.e., about 2 to about 25 percent molybdenum based on the total weight of the catalyst including the porous carrier. Smaller amounts of molybdenum than about 2 percent may be used, but this reduces the activity. Larger amounts than about 25 percent can also be used but do not increase the activity and constitute an extra expense. We prefer to utilize a catalyst containing about 4 to about 16 percent by weight molybdenum, most preferably about 10 per cent; about 2 to about 10 percent by weight nickel, most preferably about 2 percent; and about 1 to about 5 percent by weight cobalt, most preferably about 1.5 percent. While a three-metal component catalyst as in (a) is preferred, we can also use a two-metal component catalyst as in "(b)". When using a two-metal component catalyst, we prefer to utilize one containing about 15 to about 25 percent (e.g., about 19 percent) tungsten and about 2 to about 10 percent (e.g., about 6 percent) nickel supported on a porous carrier such as alumina. In a two-metal component catalyst, the weight ratio of tungsten to nickel is preferably in the range of about 2:1 to about 4:1 tungsten to nickel, respectively. The amounts of the iron group metals in (a) and (b) may be varied as long as the above proportions are used. However, in (a) we prefer to utilize one iron group metal in an atomic ratio between about 0.1 and about 0.2 and to use the other iron group metal or metals in an atomic ratio of iron group metal to molybdenum of less than about 0.1 and especially between about 0.05 and about 0.1. All of the iron group metals may be present but we prefer to use only two. The amount of the hydrogenating component based on the metal itself can suitably be from about 0.5 to about 60 percent by weight of the catalyst including the porous carrier, but is usually within the range of about 2 to about 30 percent by weight of the catalyst including the carrier.

The above-mentioned active hydrogenating components can also be present as mixtures. On the other hand, chemical combinations of the iron group metal oxides or sulfides with the molybdenum oxide and/or sulfide can be utilized. The catalytic hydrogenating components can be used with a variety of highly porous bases or supports which may or may not have catalytic activity of their own. Examples of such supports are alumina, bauxite, silica gel, kieselguhr, thoria, zirconia, molecular sieves or other zeolites, both natural and synthetic, or mixtures of the foregoing, as long as the particular catalyst support which is employed has pores sufficiently large to avoid quick plugging by the deposition of the ash and/or organo-metallic constituents of the coal used as charge stock. By "highly porous" and "pores sufficiently large" is meant a pore volume of from about 0.1 to about 1.0 cc per gram, preferably from about 0.25 to about 0.8 cc per gram; a surface area from about 50 to about 450 m$^2$/gram, preferably from about 80 to about 300 m$^2$/gram; a pore radius size range from about 10 A to about 300 A with the average pore radius being from about 20 A to about 100 A.

The hydrogenation catalysts referred to hereinabove and the method by which they are made are not per se, part of the present invention. Methods of preparing such catalysts or combinations of catalysts are well-known in the prior art, such catalysts and methods of preparing the same having been described, for example, in U.S. Pat. No. 2,880,171 which issued to R. A.

Flinn and J. B. McKinley on Mar. 31, 1959.

The particle size of the composited catalyst can suitably be from about one thirty-second inch diameter to about one-fourth inch diameter extrudate, or about one thirty-second inch to about one-fourth inch diameter spheroids. The preferred size of the catalyst particles will depend upon the size of the openings in the porous partitions of the reaction vessel and upon the size of the catalyst sections in the commercial vessel. In general, the larger the catalyst sections in the commercial vessel, the larger should be the catalyst particle size. The catalyst can also be in the form of pellets or any other geometrical form, so long as the catalyst does not pass through the openings in the partitions separating the catalyst bed segments from the unobstructed passageways.

When treating a carbonaceous material, such as a coal slurry, according to the process of the invention, it is customary to continue the reaction until the catalyst activity has decreased markedly due to the deposition of ash and/or coke or other carbonaceous material thereon. In the process of the present invention, the reaction will continue over an extended period of time before regeneration of the catalyst is required. When regeneration of the catalyst becomes necessary, the catalyst can be regenerated by combustion, i.e., by contact with an oxygen-containing gas such as air at an elevated temperature usually about 900° F. or by any other means normally used to regenerate hydrogenation catalysts. The manner in which the catalyst is regenerated does not constitute a portion of the present invention.

The process of the invention will be more readily understood by referring to

Figure 1:
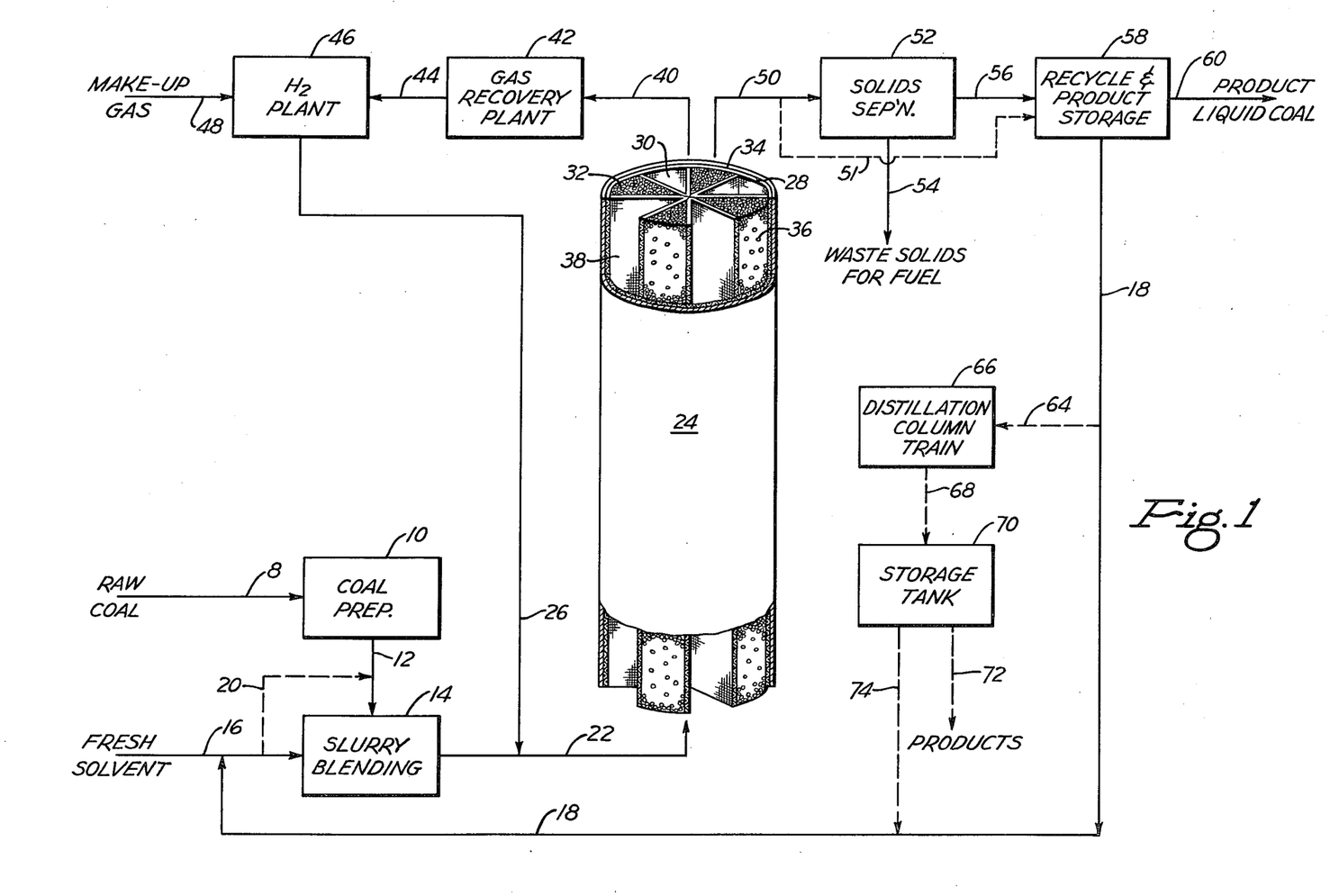
FIG. 1, which is a schematic flow diagram of one embodiment of the invention showing a preferred form of a multi-partitioned reaction vessel wherein the cross-sectional segments of the vertical reaction zones are sectors. While the process described in FIG. 1 is with reference to the treatment of raw coal, it is to be understood that any solid carbonaceous material, as defined herein, having a tendency to form coke and/or ash during conversion can suitably be treated by the process of this invention. Coal is simply exemplary of the carbonaceous materials which can be treated in the process of the invention.

Referring now to FIG. 1, a carbonaceous solid material, such as raw coal, is introduced into coal preparation unit 10 through line 8. In coal preparation unit 10, the coal is ground by a suitable attrition machine such as a hammermill to size, for example, such that 50 percent of the coal will pass through a 40 mesh sieve (U.S. Series). Ground coal particles are transferred from coal preparation unit 10 through line 12 into a slurry blending unit 14 where the coal is mixed with a solvent in a weight ratio of solvent to coal of about 1:1 to about 3:1. When the process is initiated, fresh solvent, such as anthracene oil, is introduced into slurry blending unit 14 through line 16. As the process continues, a sufficient amount of solvent oil is produced so that fresh solvent is gradually replaced by recycle solvent oil which is introduced into slurry blending unit 14 through line 18. If desired, all or a portion of the solvent can be passed through line 20 to line 12 to aid in transferring ground coal to slurry blending unit 14. A slurry of coal particles and solvent is removed from slurry blending unit 14 through line 22, where it is mixed with high pressure hydrogen supplied through line 26. The mixture of coal, oil and hydrogen is then introduced into the bottom of reaction vessel 24. If desired, the oil-coal mixture in line 22 may be preheated by any suitable heat exchange means (not shown) prior to being introduced into reaction vessel 24. While the mixture of coal, solvent and hydrogen is shown as being introduced into the bottom of reaction vessel 24 for upflow operation, the mixture can be introduced into the top of reaction vessel 24 for downflow operation. Preferably, however, the mixture of coal, solvent and hydrogen is introduced into the bottom of reaction vessel 24 and passed upflow through reaction vessel 24 in a flooded-bed type reaction system. While the hydrogen is shown as being introduced together with the coal and solvent into the bottom of reaction vessel 24, the hydrogen can be introduced at multiple places through the reaction vessel. Similarly some of the coal and/or solvent can be introduced at multiple places throughout the reactor.

The hydrogen is introduced into reaction vessel 24 in amounts between about 2000 and about 20,000 standard cubic feet of hydrogen per barrel of coal slurry. The hydrogen gas stream is preferably at least about 60 percent hydrogen, the remainder of the gas stream being gases such as nitrogen, carbon monoxide, carbon dioxide and/or low molecular weight hydrocarbons, such as methane. The exact reaction conditions in reaction vessel 24 depend upon a number of factors, for example, the amount of liquefaction desired, but, in general, include temperatures of 500° to 900° F., usually temperatures between about 750° and about 875° F., and pressures of about 500 to about 10,000 psig, usually pressures between about 1500 and 4000 psig. The weight hourly space velocity of the coal slurry is suitably from about 0.25 to about 40, usually about 0.5 to about 20 unit weight of charge stock per unit weight of catalyst per hour. The catalyst can be any hydrogenation catalyst as defined hereinabove, but is preferably a three-metal component catalyst comprising molybdenum, nickel and cobalt supported on a carrier such as alumina. The particle size of the catalyst will depend upon the size of the reaction vessel and upon the size of the openings in the porous partitions of the reaction vessel. The particles of catalyst are sufficiently large so that they do not pass through the openings in the porous partitions.

Reaction vessel 24 may contain one segmented basket 28 or it may contain a number of such baskets stacked on top of each other so that the unobstructed passageways 30 and the catalyst-containing segments 32, in this embodiment, are in direct line through the reaction vessel. Basket 28 is in cylindrical shape, the outer surface 34 of which may be solid, but is preferably provided with openings large enough to permit the transfer of reactants (including coal fines) and products therethrough while retaining the catalyst particles 36 therein. The inner walls 38 of the partitions separating the catalyst segments from the unobstructed passageways are provided with openings large enough to permit the transfer of reactants (including coal fines) and products therethrough while not allowing catalyst particles to pass from the catalyst segments. In FIG. 1, the cross-sectional configuration of the segments in basket 28 are sectors. Other configurations of substantially elongated reaction zones wherein said reaction zones are substantially vertically disposed within the reaction vessel, as shown in FIGS. 2 to 5, 7 and 8, will be discussed hereinbelow.

Gases from reaction vessel 24 are removed through line 40 to a gas recovery plant 42. Gas recovery plant 42 comprises any suitable means for separating gases from liquids. The gases separated in gas recovery plant 42 are passed through line 44 to a hydrogen plant 46 where hydrogen is recovered and any low molecular weight hydrocarbon gases are converted to hydrogen. Depending upon economic considerations, the low molecular weight hydrocarbon gases can be sold and hydrogen generated by other satisfactory means, such as gasification of coal, or a product stream containing undesirable materials, such as high-boiling tars or waste solids, can be used as a hydrogen source. Hydrogen is then returned through line 26 to reaction vessel 24. Any makeup gas which is needed to supply hydrogen for the hydrogen plant is added through line 48. Liquid products containing some solid materials are removed from reaction vessel 24 through line 50 into solids separation unit 52. If desired, solids separation unit 52 can be bypassed, for example, when substantially no solid materials are in the liquefied product, in which case the liquid products removed from reaction vessel 24 can be passed directly by line 51 to a product storage and recycle unit 58. Solids separation unit 52 comprises any suitable means for separating solids from liquids such as a continuous rotating filter, centrifuge, or liquid cyclone. Solid materials are removed from the separation unit 52 through line 54. If the solid materials removed by line 54 contain some of the original carbonaceous materials, as in the case wherein it is desired not to solubilize all of the original carbonaceous material, and solid inorganic material, the two can be separated from each other by any means convenient in the art. The solid carbonaceous material will be upgraded, for example, be lower in sulfur content than the original charge, and can be used as fuel. The inorganic materials, for example, ash, can be used as such, or after calcination, alone or in combination with another hydrogenation catalyst different from that present in the catalyst beds, as additional catalyst and introduced into the system along with the charge in line 22. In such case the "unobstructed, catalyst-free zones" referred to above will also contain catalyst to the extent of such addition. The liquid product is removed from separation unit 52 through line 56 to product storage and recycle unit 58, from which liquid product can be removed through line 60. A portion of the liquid product is recycled as solvent through line 18 and returned to slurry blending unit 14. Optionally, the liquid product from storage and recycle unit 58 can be sent through line 64 to a distillation column train 66 where various cuts can be removed at a desired pressure, usually under vacuum for the recovery or specific distillation cuts which can then be passed through line 68 to a storage tank farm 70. The various products can then be removed through line 72. In this manner specific solvent cuts can be removed and recycled as solvent through line 74 to slurry blending unit 14. It is believed obvious to those having ordinary skill in this art that by varying the reaction conditions in reaction vessel 24, but within the range of conditions set forth above, more or less hydrocracking can occur, which would give more or less liquefied product and/or more or less lighter boiling products for distillation in distillation column train 66. It is also within the purview of the disclosure herein that product in line 50 containing solids be sent directly to a distillation column train wherein the component parts thereof can be separated into selected fractions.

Other exemplary configurations in suitable multipartitioned baskets providing unobstructed passageways and catalyst-containing segments are shown in FIGS. 2 to 5.

Figure 2:
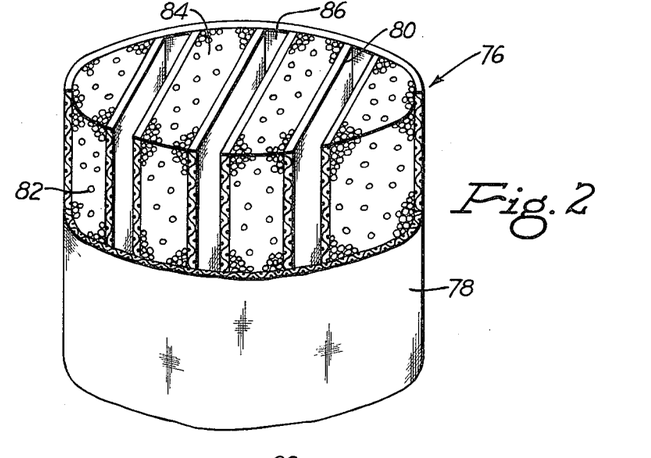
FIGS. 2 through 8 are schematic drawings showing other configurations of suitable multi-partitioned reaction vessels which can be used in the process of the invention.

In FIG. 2, a segmented basket 76 is cylindrical in shape, the outer surface 78 of which may be solid, but is preferably provided with openings large enough to permit the transfer of reactants (including coal fines) and products therethrough while retaining catalyst particles 82 therein. The inner walls 80 of the partitions separating catalyst segments 84 from unobstructed passageways 86 are provided with openings large enough to permit the transfer of reactants (including coal fines) and products therethrough while not allowing catalyst particles to pass from the catalyst segments. The unobstructed passageways 86 are parallel to the direction of flow of charge stock through the reaction vessel. The unobstructed passageways 86 alternate with catalyst segments 84. The porous partitions shown in FIG. 2 are flat plates vertically placed in substantially parallel planes. The space between the plates may be from about ¼ inch to ½ inch or more depending upon the size of the reaction vessel. It will be understood that the plates can be either perfectly flat, as shown, or corrugated. The plates are made of metal such as a metal screen wire.

Figure 3:
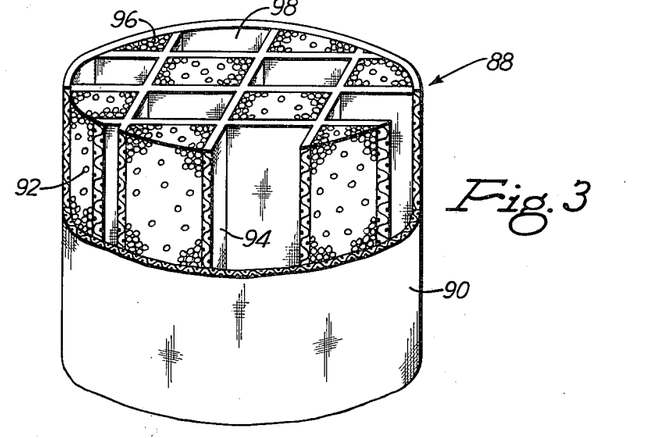

In FIG. 3, a checkerboard or honeycomb-like three-dimensional configuration is shown where segmented basket 88 is cylindrical in shape, the outer surface 90 of which may be solid, but is preferably provided with openings large enough to permit the transfer of reactants (including coal fines) and products therethrough while retaining catalyst particles 92 therein. The inner walls 94 of the partitions separating catalyst segments 96 from unobstructed passageways 98 are provided with openings large enough to permit the transfer of reactants (including coal fines) and products therethrough while not allowing catalyst particles to pass from the catalyst segments. The unobstructed passageways 98 are parallel to the direction of flow of charge stock through the reaction vessel. The unobstructed passageways 98 alternate with catalyst segments 96. The porous partitions in FIG. 3 are placed in intersecting planes so as to form a honeycomb-like structure, which leaves alternating upward unobstructed passageways and catalyst zones. The space between the partitions may be from about ¼ inch to about ½ inch or more. The partitions may be made of screen wire.

Figure 4:
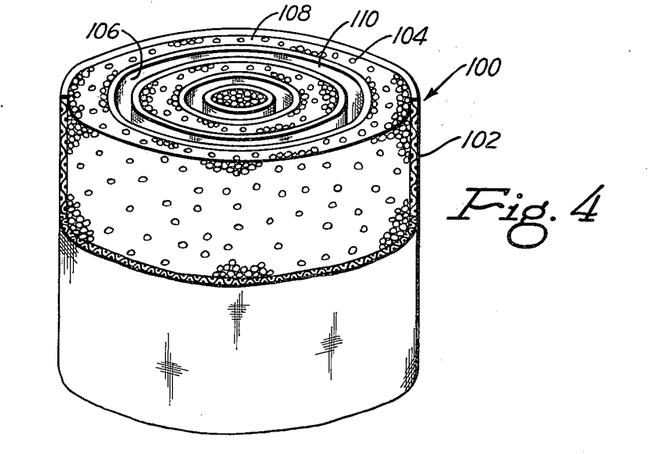

In FIG. 4, a series of concentric cylinders are shown where a multi-partitioned basket 100 is cylindrical in shape, the outer surface 102 of which may be solid, but is preferably provided with openings large enough to permit the transfer of reactants (including coal fines) and products therethrough while retaining catalyst particles 104 therein. The inner walls 106 of the cylindrical partitions separating catalyst segments 108 from unobstructed passageways 110 are provided with openings large enough to permit the transfer of reactants (including coal fines) and products therethrough while not allowing catalyst particles to pass from the catalyst segments 108. The porous partitions in FIG. 4 are cylindrical in shape, the space between the cylinders being from about ¼ inch to about ½ inch or more depending upon the size of the reaction vessel. It will be understood that the cylinders can be smooth, as shown, or corrugated. The cylinders are made of metal such as a metal screen wire.

Figure 5:
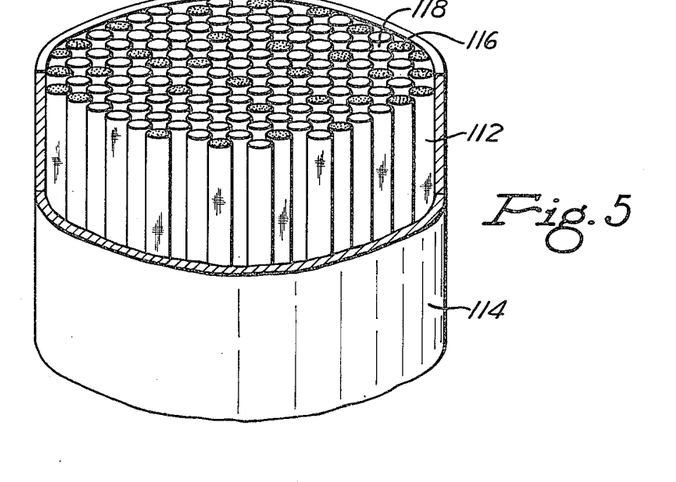

In FIG. 5, a set of porous tubes 112 arranged in a symmetrical or random pattern are placed inside a reactor shell 114. The walls of the tubes are provided with openings large enough to permit the transfer of reactants (including coal fines) and products therethrough while retaining catalyst particles 116 therein. The unobstructed passageways 118 are parallel to the direction of flow of charge stock through the reaction vessel. The tubes are maintained in position by a collar which is not shown in FIG. 5. The tubes may be from about ¼ inch to about 4 inches or more in diameter. The tubes may be formed from screen wire.

FIGS. 1 to 5 show cylindrical-type multi-partitioned reaction vessels since reactors of this configuration are more common. It should be understood, however, that the geometrical shape is not critical and that square, rectangular, octagonal, elliptical, etc., designs can be employed. It is only necessary that the reaction vessel contain a plurality of closely-spaced, substantially-vertical reaction zones, separated by porous partitions wherein a portion of the zones are adapted to contain solid particulate catalyst which will not pass through the porous partitions. Another portion of the reaction zones form substantially unobstructed passageways through the reaction vessel. In the figures shown, the unobstructed passageways form an alternating symmetrical pattern with the catalyst-containing portions of the reaction vessel. While this is a preferred type of reaction system, it is not essential that a symmetrical-type design be employed. Similarly, it is not critical as to the precise number of segments.

Figure 6:
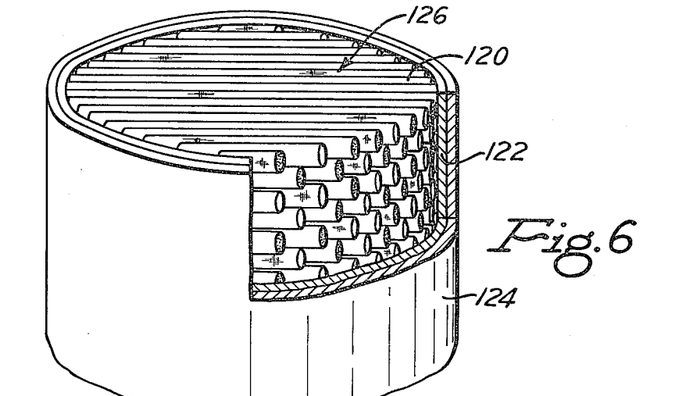

Although the process described herein has been illustrated with a plurality of closely-spaced, substantially-vertical reaction zones separated by porous partitions, it is within the purview of our invention also to carry out the process utilizing reaction zones identical to those described above but wherein said reaction zones are otherwise spatially disposed within the reaction vessel. For example, the reaction zones can be mounted substantially horizontally within the reaction vessel and the slurry defined above, will still pass in and out of the catalyst segments and the desired hydrogenation reaction will still take place. The disposition of reaction zones within a reaction vessel, in one such embodiment, is illustrated in FIG. 6, wherein there is disposed a set of porous tubes 120, similar in design and spacing to porous tubes 112 of FIG. 5, but wherein said latter tubes are securely attached, by any suitable means, to a shell 122 removably positioned within reactor shell 124 to form a bundle 126 which is horizontally disposed within reaction shell 124. If desired, more than one such tube bundle 126 can be disposed within the reaction vessel, one above another.

Figure 7:
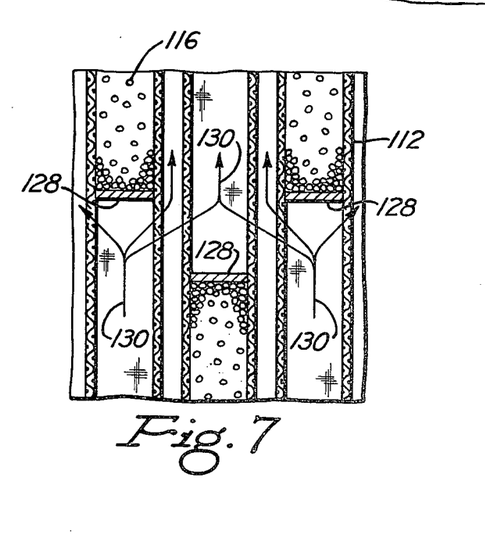
Figure 8:
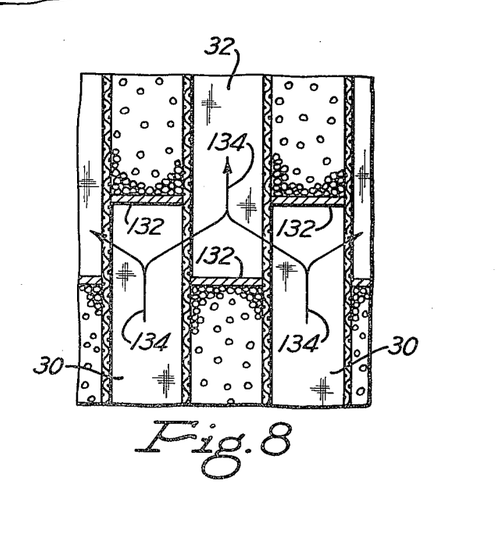

The catalyst segments need not be fully filled with catalyst in order to obtain the desired results herein. As shown in FIG. 7, if porous tubes 112 are used, as in FIG. 5, the catalyst 116 will partially fill the tubes 112 and will be retained in place by plates 128. The direction of movement of material in such case is exemplified by the arrows 130. This modification is further illustrated in FIG. 8, wherein the segmented bed arrangement of FIG. 1 is used. In this case some catalyst is in each of adjacent segments 30 and 32 but does not fully fill each of said segments. The catalyst is maintained in place by plates 132 and the arrangement is such that the desired movement of the reaction material, as shown by the arrows 134, takes place. The amount of catalyst present in the embodiments of FIGS. 7 and 8 will correspond substantially to the amount present in the corresponding embodiments of FIGS. 5 and 1, respectively.

The number of catalyst segments and unobstructed passageways in the reaction vessel can vary over a wide range depending upon the size of the vessel. Naturally, as the diameter of the reaction vessel increases, the number of catalyst-containing segments can also be increased. While there may be, for example, as few as about four catalyst segments, there may be as many as about 10,000. For example, in a commercial unit having a reaction vessel that is 25 feet in diameter, we may employ from about 200 to about 2,000 porous catalyst-containing tubes of the type referred to in FIG. 5. In a 2-inch diameter reaction vessel of the type shown in FIG. 1, we may have about 4 sectorial-shaped catalyst-containing segments. In general, the total cross-sectional area of the catalyst segments should be such that the entire catalyst is available for contact with fluid passing through the reaction vessel. If the cross-sectional area of any single catalyst segment is too large the charge stock will not have easy access to and from the catalyst segments, thus tending to give rise to coking and plugging in the catalyst segments. Thus, it is preferred that the ratio of cross-sectional area of an individual catalyst segment to the total cross-sectional area of all catalyst segments be as low as possible. Naturally, there is an economic limit to the number of individual catalyst segments which can be employed. With smaller, i.e., about 2-inch, reaction vessels, the ratio of the cross-sectional area of one catalyst segment to the total of all catalyst segments is about 1:4. In larger reaction vessels, i.e., about 10 to about 15 feet, the ratio of the cross-sectional area of one catalyst segment to the total area of all catalyst segments can be on the order of at least about 1:1, preferably about 1:20 to about 1:10,000 or more.

The cross-sectional area of any particular catalyst segment is also dependent upon th size of the reaction vessel. Thus, the cross-sectional area of a single catalyst segment can vary from about 0.5 square inches for a small vessel to about 50 square inches for a large reaction vessel. In general, the cross-sectional area for a single catalyst segment is about 1 to about 30 square inches.

The ratio of the cross-sectional area of total catalyst segments to total unobstructed passageways can vary over a wide range depending on the size of the reaction vessel. In general, the ratio of the total cross-sectional area of unobstructed passageways to the total cross-sectional area occupied by catalyst is preferably about 20:1 to about 1:10. Since the length of the catalyst segments and the length of the unobstructed passageways in any given reaction vessel are preferably the same, the volumetric ratio of total unobstructed passageways to total catalyst is also preferably the same as the cross-sectional area ratios, i.e., about 20:1 to about 1:10. The ratio of the total cross-sectional area occupied by catalyst to the total cross-sectional area (occupied and unoccupied) of the reaction vessel is preferably about 10:1 to about 1:10, most preferably about 3:1 to about 1:3. As noted hereinabove, the catalyst segments are preferably parallel to each other and to the unobstructed passageways and have a uniform cross-sectional area throughout the reaction vessel. It will be understood, however, that catalyst segments of varying cross-sectional areas can be employed and that the catalyst segments need not be parallel. Thus, in FIG. 5, tubes of various sizes can be employed in constructing the reaction vessel.

The size of the openings in the porous partitions separating the catalyst segments from the unobstructed passageways can vary. The openings must be sufficiently large to permit the passage of fines and ash from the unobstructed passageways to the catalyst segments and then back again to the unobstructed passageways. As the charge stock passes through the reaction vessel, it passes in and out and through the various catalyst segments and unobstructed passageways an indeterminate number of times. The openings are large enough to permit coal fines and ash to pass through but not large enough to allow catalyst particles to pass through. In general, the size of the openings in the porous partitions is within the range of about ½ inch to about 40-mesh sieve (U.S. Series), but usually the openings are from about 6 to about 20-mesh (U.S. Series). If the catalyst particles are about ¼-inch diameter, the size of the openings in the partitions are just under about ¼ inch in diameter. The configuration of the openings is not important and is dictated by the ease of fabrication of the partitions. Screenlike partitions have been used successfully to retain the catalyst while permitting easy passage of the coal slurry particles to and from the catalyst segments. In one embodiment of the invention, catalyst particles approximately one-eighth inch in diameter were retained where the porous partitions were made of screen wire having square openings approximately 0.079 inch in a side. The openings in the partitions can be circular, octagonal, square or any other shape. The ratio of open area to solid area in the porous partitions is preferably as high as possible consistent with good structural strength while retaining the catalyst particles.

The present invention will be further described with reference to the following illustrative examples. In Examples I to IV, VII and IX, the carbonaceous material employed is a bituminous coal identified as "Pittsburgh seam coal". In Example V, the carbonaceous material employed is a bituminous, high-sulfur (4.63% S) coal identified as "Kentucky coal". In Example VI, the carbonaceous material employed is a low-sulfur, low-ash subbituminous coal identified as "Wyoming coal". In Example VIII the carbonaceous material employed is lignite. In Examples I and III to VII and IX the coal-oil (30/70, that is, 30 weight percent coal and 70 percent oil) slurry is introduced directly into the catalytic hydrogenation reaction vessel. Examples I, II, IV and V are of moderate (55 to 89 hours) duration; Examples III and VI are of long (245 hours) duration. In Example II, the coal-oil (30/70) slurry is predigested with hydrogen prior to being introduced into the catalytic reaction vessel. Examples I to III and V to VII and IX are conducted with a frest hydrogenation catalyst (1.0% Co, 0.5% Ni, 8.0% Mo) composited with alumina. Example IV is conducted with regenerated catalyst obtained by the air oxidation of a composite of spent catalysts from Examples I to III. Example VII is conducted with recycle solvent obtained by distilling the combined slurry products obtained in Example I to III. In Example IX, the lower one-half of the reaction vessel is completely filled with the hydrogenation catalyst, i.e., there are no unobstructed passageways.

The degree of coal solvation which is reported in the footnotes of the tables summarizing the results obtained in the various examples is obtained using the following formula:

$$\% \text{ Coal Solution} = 100 \times \frac{MAF \text{ coal feed} - MAF \text{ dry cake}}{MAF \text{ coal feed}}$$

where MAF = moisture and ash freed.

EXAMPLE I

A 30 weight percent slurry of bituminous coal with solvent oil was prepared by mixing 30 parts by weight of crushed (average of 200 mesh sieve [U.S. Series]) Pittsburgh seam coal with 70 parts by weight of anthracene oil. 804 grams hydrogenation catalyst was charged into alternating sectorial segments of baskets which were housed in a 2-inch diameter by 48-inch high reaction vessel similar to that shown in FIG. 1. The total volume of catalyst charged was approximately 1000 cc. The total volume of the reaction vessel was 3500 cc. Thus, the ratio (both volume and cross-sectional area) of total catalyst charge to total reaction vessel volume (and cross-sectional area) is about 1:3. The catalyst used was a three-metal component catalyst (10% Co, 0.5% Ni, 8.0% Mo) composited with alumina having a particle size of 4 to 10 mesh (U.S. Series). The openings in the partitions separating the unobstructed passageways from the catalyst bed segments were square in shape (10-mesh screen). The coal-oil (30/70) slurry was charged to the reaction vessel at an average feed rate of 3000 cc per hour (7.71 pounds per hour or 4.35 lb of slurry/lb catalyst hr). Elemental analyses of the Pittsburgh seam coal, anthracene oil and coal-oil (30/70) slurry are set forth in Table I.

TABLE I

| Elemental Analysis, % by Wt. | Pittsburgh Seam Coal | Anthracene Oil | Coal-Oil (30/70) Slurry |
|---|---|---|---|
| Carbon | 76.84 | 91.25 | 86.93 |
| Hydrogen | 5.06 | 5.98 | 5.70 |
| Nitrogen | 1.61 | 0.95 | 1.15 |
| Oxygen | 8.19 | 1.76 | 3.69 |
| Sulfur | 1.49 | 0.50 | 0.80 |
| Ash | 8.28 | 0.01 | 2.49 |

Hydrogen was introduced into the reaction vessel at a rate of 10,000 SCF/BBL slurry. The reaction vessel was maintained at a temperature of 800° F. and at a pressure of 3500 psig. The reaction was allowed to proceed until there was evidence of some catalyst deactivation. Overhead from the reaction vessel was separated into a gas stream and a liquid stream. The gas stream consists essentially of hydrogen. The liquid stream consists essentially of a hydrogenated liquid product containing some solids, i.e., unconverted coal and ash. In order to determine the extent of the hydrogenation, samples of the liquid product stream were periodically withdrawn and filtered to recover a solids portion and a filtrate portion. The solids or filter cake portion was washed with ethyl acetate and dried. The dried filter cake and a sample of the filtrate portion were then separately subjected to an elemental analysis. The filtrate portion was subjected to further evaluation by distilling the filtrate in a batch distillation unit, distillation being terminated at a pot temperature of 750° F. at 3 mm Hg pressure. The pot contents were labeled as "residue" and were submitted for elemental analysis. The distillate was identified with reference to its "average distillation temperature (Avg DT)" which is an average of the overhead vapor temperature recorded at 10 percent volumetric incremental levels during the distillation, i.e., for distillate levels of 20, 30, 40, 50, 60 and 70 volume percent.

A detailed summary of the results obtained in Example I are set forth in Table II.

cc/hr. (5.14 pounds per hour) Another portion of the coal-oil (30/70) slurry was predigested under the same conditions except for the flow rate which was increased to 5000 cc/hr. (12.85 pounds per hour). The predigested slurries thus obtained were combined and used as charge stock to the alternating sectorial segments of the reaction vessel according to the procedure of Example I. Elemental analyses of the coal-oil (30/70) slurry before and after predigestion are set forth in Table III.

TABLE II

Summary for Example I

| | Liquid Stream from Reaction Vessel Total Slurry | Filtration of Liquid Stream from Reaction Vessel | | | | | | | | Distillation of Filtrate | | | | |
|---|---|---|---|---|---|---|---|---|---|---|---|---|---|---|
| | | Dry Cake Analysis | | | | Filtrate Analysis | | | | Distillate | Amount | Residue Analysis | | |
| Sample Time, Hr. | Analysis % by Wt S | Amount %by Wt | % by Weight C | H | S | C/H Ratio | % by Weight H | N | O | S | Avg. DT °F. | % by Wt. | C/H Ratio | % by Wt H  S |
| 5–6 | 0.16 | 6.4 | 47.98 | 3.29 | 1.73 | 11.12 | 8.09 | 0.50 | 0.78 | 0.05 | 566.7 | 8.5 | 13.12 | 6.88  0.22 |
| 17–18 | 0.14 | 6.1 | 52.95 | 3.42 | 1.48 | 11.17 | 8.09 | 0.57 | 0.90 | 0.05 | 590.3 | 10.9 | 13.64 | 6.54  0.23 |
| 53–54 | 0.24 | 7.1 | 49.23 | 3.34 | 1.90 | 11.84 | 7.59 | 0.72 | 1.22 | 0.11 | 619.0 | 14.7 | 14.19 | 6.25  0.32 |
| 89; | 0.19 | 5.5 / 67(a) | 52.08 | 3.36 | 2.00 | 11.60 | 7.80 | 0.61 | 1.06 | 0.08 | 587.2 | 10.4 | 14.13 | 6.17  0.28 |

(a)Average percent by weight of dry filter cake in the liquid stream from the reaction vessel based on 13 samples taken over a period of 89 hours. This is equivalent to an ash-free coal solvation of 84.5 per cent.

It will be noted from the data in Tables I and II that a significant amount of desulfurization was obtained by utilizing the process of the invention. The composited feed stream contained 0.80 percent by weight of sulfur. The liquid stream from the reaction vessel after 89 hours of operation contained only 0.19 percent by weight of sulfur most of which was in the solid (ash) phase. Upon filtration of the liquid stream from the reaction vessel, the filtrate contained even less sulfur, i.e., 0.08 percent by weight after 89 hours. The degree of coal solvation in this Example was 84.5 percent.

EXAMPLE II

In this Example, the procedure of Example I was repeated except the coal-oil (30/70) slurry was predigested with hydrogen before being charged to the reaction vessel. One portion of the coal-oil (30/70) slurry was predigested by contacting the slurry in a 3500 cc reaction vessel at a temperature of 800° F., pressure of 2000 psig, a hydrogen feed rate of 4000 SCF/BBL of total feed and a slurry flow rate controlled at 2000

TABLE III

| Elemental Analysis % By Wt. | Coal-Oil (30/70) Slurry | |
|---|---|---|
| | Before Predigestion | After Predigestion |
| Carbon | 86.93 | 88.55 |
| Hydrogen | 5.70 | 6.08 |
| Nitrogen | 1.15 | 1.15 |
| Oxygen | 3.69 | 2.76 |
| Sulfur | 0.80 | 0.50 |
| Ash | 2.49 | (2.49) |

A detailed summary of the results obtained in Example II are set forth in Table IV.

TABLE IV

Summary for Example II

| | Liquid Stream from Reaction Vessel Total Slurry | Filtration of Liquid Stream from Reaction Vessel | | | | | | | | Distillation of Filtrate | | | | |
|---|---|---|---|---|---|---|---|---|---|---|---|---|---|---|
| | | Dry Cake Analysis | | | | Filtrate Analysis | | | | Distillate | Amount | Residue Analysis | | |
| Sample Time, Hr. | Analysis % by Wt S | Amount % by Wt | % by Weight C | H | S | C/H Ratio | % by Weight H | N | O | S | Avg. DT °F. | % by Wt. | C/H Ratio | % by Wt H  S |
| 4–5 | <0.17 | 4.4 | 54.51 | 3.35 | 2.65 | 11.54 | 7.94 | 0.55 | 0.78 | <0.05 | 585 | 13.2 | 14.50 | 6.23  0.19 |
| 14–15 | 0.18 | 4.7 | 54.29 | 3.30 | 2.31 | 11.30 | 8.01 | 0.58 | 0.79 | 0.07 | 564 | 9.1 | 14.70 | 6.13  0.09 |
| 44–45 | 0.20 | 4.4 | 50.28 | 2.84 | 2.97 | 12.06 | 7.50 | 0.69 | 1.06 | 0.07 | 576 | 12.8 | 14.56 | 6.21  0.18 |
| 75–77 | 0.28 | 4.7 / 4.1(a) | 50.68 | 2.92 | 4.19 | 12.20 | 7.42 | 0.71 | 1.10 | 0.08 | 587 | 13.0 | 14.63 | 6.09  0.27 |

(a)Average per cent by weight of dry filter cake in the liquid stream from the reaction vessel based on 10 samples taken over a period of 77 hours. This is equivalent to an ash-free coal solvation of 95.9 per cent.

It will be noted from the data in Tables III and IV that a significant amount of desulfurization was obtained utilizing the process of the invention. The composited predigested feed stream contained 0.50 percent by weight of sulfur. The liquid stream from the reaction vessel after 77 hours of operation contained only 0.28 percent by weight of sulfur most of which was in the solid (ash) phase. Upon filtration of the liquid stream from the reaction vessel, the filtrate contained even less sulfur, i.e., 0.08 percent by weight after 77 hours. The use of a predigested slurry as in this Example II as compared with Example I wherein the slurry was not predigested shows a slightly greater reduction of sulfur content in the filtrate, i.e., <0.05 to 0.08 percent using predigested slurry as opposed to <0.05 to 0.11 when the slurry was not predigested. The degree of coal solvation in this Example was 95.9 percent. Therefore, there appears to be an advantage for the use of predigestion to increase the level of coal solvation.

EXAMPLE III

In this Example, the procedure of Example I was repeated except the process was allowed to continue for a period of 245 hours. A detailed summary of the results obtained in Example III are set forth in Table V.

weight after 245 hours. The degree of coal solvation in this Example was 87.7 percent.

EXAMPLE IV

In this Example, the procedure of Example I was repeated except the catalyst in this Example was a regenerated catalyst. The regenerated catalyst was obtained by subjecting a blend of spent catalyst obtained from Examples I, II and III to oxidation by air at a temperature of 825° to 900°F. Also, in this Example the coal-oil (30/70) slurry was prepared from another sample of Pittsburgh seam coal. The elemental analysis of the coal-oil (30/70) slurry used in this Example are shown in Table VI.

TABLE VI

| Elemental Analysis % By Wt. | Coal-Oil (30/70) Slurry |
| --- | --- |

TABLE V

Summary for Example III

| | Liquid Stream from Reaction Vessel Total Slurry | Filtration of Liquid Stream from Reaction Vessel | | | | | | | | Distillation of Filtrate | | | |
| --- | --- | --- | --- | --- | --- | --- | --- | --- | --- | --- | --- | --- | --- |
| | | Dry Cake Analysis | | | | Filtrate Analysis | | | | Distillate Avg. DT °F. | Residue | | |
| | | | % by Weight | | | | % by Weight | | | | Amount | | Analysis |
| Sample Time, Hr. | Analysis % by Wt S | Amount % by Wt | C | H | S | C/H Ratio | H | N | O | S | | % by Wt. | C/H Ratio | % by Wt H S |
| 4–5 | 0.10 | 2.02[b] | — | — | 1.86 | 10.40 | 8.63 | 0.47 | 0.78 | 0.06 | 574 | 9.3 | 12.07 | 7.33 0.27 |
| 44–45 | 0.20 | 6.6 | 71.61 | 5.42 | 1.83 | 11.44 | 7.88 | 0.68 | 1.04 | 0.08 | 589.2 | 10.7 | 13.95 | 6.35 0.41 |
| 104–105 | <0.2 | 6.6 | 56.54 | 3.46 | 2.56 | 12.38 | 7.35 | 0.88 | 1.40 | <0.05 | — | — | — | — — |
| 124–125 | — | 5.5 | — | — | — | — | — | — | — | — | 626.0 | 15.7 | 14.48 | 6.02 0.36 |
| 164–165 | 0.32 | 5.8 | 50.24 | 3.09 | 2.30 | 13.14 | 6.85 | 0.92 | 1.52 | 0.19 | 621.0 | 16.7 | 14.56 | 6.04 0.38 |
| 244–245 | 0.48 | 4.9 | 54.16 | 3.16 | 2.66 | 13.07 | 6.88 | 0.94 | 1.54 | 0.37 | 623.7 | 19.8 | 14.62 | 5.99 0.78 |
| | | 5.8[a] | | | | | | | | | | | | |

[a] Average per cent by weight of dry filter cake in the liquid stream from the reaction vessel based on 24 samples taken over a period of 245 hours. This is equivalent to an ash-free coal solvation of 87.7 per cent.
[b] Sample of dried cake appeared to be partially burnt (air was present in drying oven). Nitrogen was used in oven during drying of subsequent filter cakes.

It will be noted from the data in Table V that a significant amount of desulfurization was effected over the 245-hour period of operation. The composite feed stream contained 0.80 percent by weight of sulfur. The liquid stream from the reaction vessel after 245 hours of operation contained 0.48 percent by weight of sulfur most of which was in the solid (ash) phase. Upon filtration of the liquid stream from the reaction vessel, the filtrate contained even less sulfur, i.e., 0.37 percent by

| Carbon | 87.64 |
| --- | --- |
| Hydrogen | 5.66 |
| Nitrogen | 1.14 |
| Oxygen | 2.97 |
| Sulfur | 0.85 |
| Ash | 2.07 |

A detailed summary of the results obtained in Example IV utilizing regenerated catalyst are set forth in Table VII.

TABLE VII

Summary for Example IV

| | Liquid Stream from Reaction Vessel Total Slurry | Filtration of Liquid Stream from Reaction Vessel | | | | | | | | Distillation of Filtrate | | | |
| --- | --- | --- | --- | --- | --- | --- | --- | --- | --- | --- | --- | --- | --- |
| | | Dry Cake Analysis | | | | Filtrate Analysis | | | | Distillate Avg. DT °F. | Residue | | Analysis |
| Sample Time, Hr. | Analysis % by Wt S | Amount % by Wt | C | H | S | C/H Ratio | H | N | O | S | | Amount % by Wt. | C/H Ratio | % by Wt H S |
| 4–5 | 0.19 | 5.7 | 61.58 | 3.72 | 2.24 | 11.33 | 7.94 | — | 0.92 | 0.07 | 596.5 | 12.8 | 14.28 | 6.25 0.15 |
| 12–13 | 0.24 | 7.3 | 64.42 | 4.33 | 2.14 | 11.91 | 7.63 | 0.65 | 1.46 | 0.09 | 610.3 | 16.6 | 13.67 | 6.52 0.27 |
| 45–46 | 0.24 | 4.1 | 57.47 | 3.42 | 2.75 | 11.53 | 7.86 | 0.67 | 0.97 | 0.13 | 595.3 | 15.0 | 14.46 | 6.07 0.05 |
| 68–69 | 0.24 | 3.5 | 53.32 | 3.55 | 3.33 | 12.75 | 7.06 | 0.65 | 1.27 | 0.13 | 600.5 | 13.6 | 15.12 | 5.80 0.34 |
| 71–72 | 0.28 | 3.2 | 52.15 | 2.99 | 3.40 | — | — | — | — | 0.18 | — | — | — | — — |
| | | 5.2[a] | | | | | | | | | | | | |

[a] Average per cent by weight of dry filter cake in the liquid stream from the reaction vessel based on 13 samples taken over a period of 72 hours. This is equivalent to an ash-free coal solvation of 89 per cent.

It will be noted from the data in Table VII that a significant amount of desulfurization was effected over the 72-hour period of operation when utilizing a regenerated catalyst. The composite feed contained 0.85 percent by weight of sulfur. The liquid stream from the reaction vessel after 72 hours of operation contained only 0.28 percent by weight of sulfur most of which was in the solid (ash) phase. Upon filtration of the liquid stream from the reaction vessel, the filtrate contained even less sulfur, i.e., 0.18 percent by weight after 72 hours. The degree of coal solvation in this Example was 89 percent.

EXAMPLE V

In order to illustrate the process of the invention utilizing a bituminous high-sulfur (4.63%) coal, the procedure of Example I was repeated using a Kentucky coal. Elemental analyses of the Kentucky coal, anthracene oil and coal-oil (30/70) slurry are set forth in Table VIII.

TABLE VIII

| Elemental Analysis % by Wt. | Kentucky Coal | Anthracene Oil | Coal-Oil (30/70) slurry |
|---|---|---|---|
| Carbon | 68.53 | 91.25 | 82.23 |
| Hydrogen | 4.60 | 5.98 | 5.42 |
| Nitrogen | 1.42 | 0.95 | 1.05 |
| Oxygen | 5.82 | 1.76 | 2.83 |
| Sulfur | 4.63 | 0.50 | 1.64 |
| Ash | 15.00 | 0.01 | 4.51 |
| Water | (1) | (1) | 2.32 |

(1) Above analysis on water-free basis

In this Example 800 grams of the hydrogenation catalyst described in Example I was charged into the alternating sectorial segments of the reaction vessel. The total volume of catalyst was 1100 cc. The total volume of the reaction vessel was 3500 cc. The coal-oil (30/70) slurry was charged to the reaction vessel at an average feed rate of 3.9 pounds/hour/pound of catalyst. Hydrogen was introduced into the reaction vessel at a rate of 10,000 SCF/BBL slurry. The reaction vessel was maintained at a temperature of 800°F. and at a pressure of 3500 psig. The reaction was continued for 55 hours. A detailed summary of the results obtained in Example V are set forth in Table IX.

It will be noted from the data in Table IX that a significant amount of desulfurization was obtained by utilizing the process of the invention. The composited feed stream contained 1.64 percent by weight of sulfur. The liquid stream from the reaction vessel after 55 hours of operation contained only 0.52 percent by weight of sulfur most of which was in the solid (ash) phase. Upon filtration of the liquid stream from the reaction vessel, the filtrate contained only 0.18 percent by weight of sulfur.

EXAMPLE VI

In order to illustrate the process of the invention utilizing a low sulfur (0.54%), low ash (4.3%) subbituminous coal from Wyoming, the procedure of Example I was repeated. Elemental analyses of the Wyoming coal, anthracene oil and coal-oil (30/70) slurry are set forth in Table X.

TABLE X

| Elemental Analysis, % By Wt. | Wyoming Coal | Anthracene Oil | Coal-Oil (30/70) Slurry |
|---|---|---|---|
| Carbon | 73.01 | 91.25 | 80.53 |
| Hydrogen | 4.53 | 5.98 | 5.22 |
| Nitrogen | 1.22 | 0.95 | 0.94 |
| Oxygen | 16.31 | 1.76 | 5.03 |
| Sulfur | 0.54 | 0.50 | 0.47 |
| Ash | 4.39 | 0.01 | 1.03 |
| Water | (1) | (1) | 6.78 |

(1) Above analysis on water-free basis

In this Example, approximately 800 grams of the hydrogenation catalyst described in Example I was charged to the alternating sectorial segments of the reaction vessel. The total volume of catalyst was about 1100 cc. The total volume of the reaction vessel was 3500 cc. The coal-oil (30/70) slurry was charged to the reaction vessel at an average feed rate of 4.7 pounds/hour/ pound of catalyst. Hydrogen was introduced into the reaction vessel at a rate of 10,000 SCF/BBL slurry. The reaction vessel was maintained at a temperature of 800°F. and at a pressure of 3500 psig. The reaction was continued for 245 hours. A detailed summary of the results obtained in Example VI are set forth in Table XI.

TABLE IX

Summary for Example V*

| | Liquid Stream from Reaction Vessel | Filtration of Liquid Stream from Reaction Vessel | | | | | | | Distillation of Filtrate | | | | |
|---|---|---|---|---|---|---|---|---|---|---|---|---|---|
| | Total Slurry Analysis | Dry Cake Analysis | | | | Filtrate Analysis | | | | Distillate Avg. DT | Residue | Analysis | |
| Sample Time, Hr. | % by Wt S | Amount % by Wt | % by Weight C | H | S | C/H Ratio | % by Weight H | N | O | S | °F. | Amount % by Wt. | C/H Ratio | % by Wt H | S |
| 5 | 0.53 | 5.90 | 23.2 | 1.49 | 7.0 | — | — | — | — | 0.12 | — | — | — | — | — |
| 15 | 6.63 | 7.04 | 29.9 | 1.95 | 7.24 | 11.86 | 7.53 | 0.68 | 1.07 | 0.10 | 590 | 12.5 | 13.91 | 6.36 | 0.43 |
| 45 | 0.62 | 7.03 | 22.4 | 1.47 | 5.8 | 11.87 | 7.59 | 0.78 | 1.30 | 0.23 | — | — | — | — | — |
| 55 | 0.52 | 8.30 | 28.5 | 1.89 | 4.2 | — | — | — | — | 0.18 | 589 | 13.9 | 13.78 | 6.27 | 0.51 |
| ** | 0.57 | 6.27 | 25.4 | 1.59 | 6.7 | 11.86 | 7.56 | 0.73 | 1.18 | 0.19 | 590 | 13.2 | 13.85 | 6.32 | 0.47 |

(*) In this Example, the coal solvation was 92 per cent.
(**) Average for 55-hour period.

TABLE XI

Summary for Example VI

| Sample Time, Hr. | Liquid Stream from Reaction Vessel Total Slurry Analysis % by Wt S | Filtration of Liquid Stream from Reaction Vessel | | | | | | | | | Distillation of Filtrate | | | | |
|---|---|---|---|---|---|---|---|---|---|---|---|---|---|---|---|
| | | Dry Cake Analysis | | | | | Filtrate Analysis | | | | Distillate Avg. DT °F. | Residue | | Analysis | |
| | | Amount % by Wt | % by Weight C | H | S | C/H Ratio | H | % by Weight N | O | S | | Amount % by Wt. | C/H Ratio | % by Wt H | S |
| 15 | — | 3.4 | 57.6 | 3.44 | 1.42 | 88.3 | 8.24 | 0.34 | 0.67 | 0.05 | 546 | 4.4 | 89.5 | 7.18 | 0.05 |
| 55 | — | 3.7 | 61.7 | 3.67 | 0.92 | 90.7 | 8.22 | 0.48 | 0.83 | 0.05 | 581 | 7.1 | 89.7 | 6.61 | 0.07 |
| 135 | 0.16 | 5.5 | 68.7 | 3.65 | 0.63 | 89.0 | 7.39 | 0.67 | 1.31 | 0.13 | 589 | 8.6 | 88.2 | 5.90 | 0.13 |
| 175 | 0.15 | 6.4 | 68.3 | 3.93 | 0.95 | 89.9 | 7.19 | 0.71 | 1.49 | 0.09 | 596 | 8.9 | 88.0 | 5.70 | 0.16 |
| 245(a) | 0.19 | 7.4 | 71.6 | 4.41 | 0.63 | 89.8 | 6.99 | 0.71 | 1.67 | 0.16 | 604 | 10.4 | 87.4 | 5.70 | 0.13 |

(a)At the end of 245 hours, the coal solvation was 72.9 per cent.

It will be noted from the data in Table XI that a significant amount of desulfurization was effected by utilizing the process of the invention. The composited feed stream contained 0.47 per cent by weight of sulfur. The liquid stream from the reaction vessel after 245 hours of operation contained only 0.19 per cent by weight of sulfur. Upon filtration of the liquid stream from the reaction vessel, the filtrate contained only 0.16 per cent by weight of sulfur. It will be noted that in each of these examples not only was there a reduction of sulfur content in the desired product but also a reduction in nitrogen content.

EXAMPLE VII

In order to illustrate the process of the invention utilizing recycle solvent obtained from previous hydrogenation reactions, approximately 250 gallons of combined slurry products obtained in Examples I, II and III were subjected to distillation in a column 6 inches by 12.5 feet packed with one-half-inch Berl Saddles. The distillation was carried out in three steps, the first of which was a topping at atmospheric pressure. Approximately 26% of distillate was removed in the topping operation to insure that no water remained in the bottoms from the atmospheric distillation. The bottoms from the atmospheric distillation were divided into two parts, one part being distilled at 5 mm Hg, flash temperature of 460°F., and overhead and reboiler temperatures of 385° and 540°F., respectively, to recover a 46% overhead product. The other part was distilled at 5 mm Hg, flash temperature of 450°F., and overhead and reboiler temperatures of 400° and 550°F. to recover a 69% overhead product. Both of the overhead products (i.e., 46% and 69%) were effective recycle solvents.

The physical and chemical properties of anthracene oil used in the preceding Examples I to VI as compared with the 46% overhead product obtained as described in this Example VII are shown in Table XII.

TABLE XII

| Solvent | Physical and Chemical Properties of Solvents | |
|---|---|---|
| | Anthracene Oil | 46% Overhead Product |
| Chemical: | | |
| Carbon | 91.25 | 90.05 |
| Hydrogen | 5.98 | 8.79 |
| Nitrogen | 0.95 | 0.82 |
| Oxygen | 1.76 | 1.08 |
| Sulfur | 0.50 | 0.08 |
| Physical: | | |
| Boiling Range (°F.) (Vapor temp. corr. 760 mm) | | |

TABLE XII-continued

| Solvent | Physical and Chemical Properties of Solvents | |
|---|---|---|
| | Anthracene Oil | 46% Overhead Product |
| IBP | 148 | 161 |
| 10% | 474 | 376 |
| 50% | 641 | 475 |
| 90% | 850 | 563 |
| EP | — | 650 |

When the 46% overhead product was used as a solvent for Pittsburgh seam coal to form a coal-oil (30/70) slurry, said slurry thereafter being employed as a charge stock and further treated as in Examples I and III, the results obtained as compared with the results obtained in Examples I and III are shown in Table XIII.

TABLE XIII

| | Effect of Using Recycle Solvent | |
|---|---|---|
| Example No.(a) | I and III | VII |
| Solvent | | |
| Anthracene Oil | 70 | — |
| 46% Overhead | — | 70 |
| Coal (Pitt Seam) | 30 | 30 |
| Feed Slurry Analysis: | | |
| Carbon | 86.93 | 87.37 |
| Hydrogen | 5.70 | 6.61 |
| Nitrogen | 1.15 | 0.85 |
| Oxygen (diff) | 3.69 | 2.50 |
| Sulfur | 0.80 | 0.59 |
| Liquid Stream from Reaction Vessel Analysis: | | |
| Carbon | 87.8 | 88.03 |
| Hydrogen | 7.80 | 7.50 |
| Sulfur | 0.15 | 0.18 |
| Filtration of Liquid Stream from Reaction Vessel: | | |
| Solids (Dry Cake) | | |
| Wt % (avg.) | 5.9 | 4.4 |
| % Solvation | 87 | 91 |
| Sulfur | 1.76 | 2.06 |
| Filtrate | | |
| Carbon | 90.0 | 89.83 |
| Hydrogen | 8.09 | 7.77 |
| Nitrogen | 0.50 | 0.56 |
| Oxygen | 0.78 | 1.00 |
| Sulfur | 0.05 | 0.06 |
| Distillation of Filtrate | | |
| Residue level (%) | 10.0 | 14.6 |
| Carbon | 90.3 | 89.23 |
| Hydrogen | 6.9 | 6.64 |
| Sulfur | 0.22 | 0.35 |

(a)For consistent comparison, Example VII (20 hours) is compared with the first 20 hours of Examples I and III.

It will be noted from the data in Table XII that the results obtained utilizing the recycle solvent (46% overhead) produced in Examples I, II and III compares favorably with the results obtained utilizing anthracene oil. The degree of coal solvation (91%) utilizing the recycle solvent was slightly higher than the degree of coal solvation (87%) utilizing anthracene oil.

EXAMPLE VIII

In order to illustrate the improved process herein with lignite, the following run was made. A 40 weight per cent slurry of lignite with solvent oil was used by mixing 40 parts by weight of crushed (average of 200 mesh sieve (U.S. Series)) lignite with 60 parts by weight of anthracene oil. 737 grams of hydrogenation catalyst were charged into four tubes of 3/4-inch diameter and 45 inches in length. These tubes were then placed in a 2-inch by 48-inch high reaction vessel similar to that of FIG. 1. The total volume of catalyst charged was 1000 cc, and the total volume of the reaction vessel was 3500 cc. Thus, the ratio (both volume and cross-sectional area) of total catalyst charge to total reaction vessel volume (and cross-sectional area) is about 1:3. The catalyst used was a three-metal component catalyst (1.0% Co, 0.5% Ni and 8.0% Mo) composited with extruded alumina of one-eighth-inch diameter. The openings in the tubes separating the unobstructed passageways from the catalyst bed were square in shape (10 mesh screen). The lignite-oil (40/60) slurry was charged to the reaction vessel at an average feed rate of about 1000 cc per hour (2.36 pounds per hour or 1.46 pound of slurry per pound of catalyst per hour). Elemental analysis of the lignite, anthracene oil and lignite oil (40/60) slurry are set forth below in Table XIV.

TABLE XIV

| Elemental Analysis, % by Wt | Lignite | Anthracene Oil | Lignite-Oil (40/60 Slurry) |
|---|---|---|---|
| Carbon | 64.41 | 91.06 | 71.10 |
| Hydrogen | 4.41 | 5.93 | 4.69 |
| Nitrogen | 0.99 | 1.03 | 0.87 |
| Oxygen | 17.42 | 1.50 | 5.35 |
| Sulfur | 0.43 | 0.47 | 0.39 |
| Ash | 12.34 | 0.01 | 3.16 |
| Water | (1) | (1) | 14.44 |

(1) Above analysis on water-free basis.

Hydrogen was introduced into the reaction vessel at a rate of 10,000 SCF/BBL slurry. The reaction vessel was maintained at a temperature of 800°F. and a pressure of 3500 psig. The reaction was allowed to proceed for 15 hours. Overhead from the reaction vessel was separated into a gas stream and a liquid stream. The gas stream consisted essentially of hydrogen. The liquid stream consisted essentially of a hydrogenated liquid product containing some solids, i.e. unconverted coal and ash. In order to determine the extent of hydrogenation, samples of the liquid product stream were periodically withdrawn and filtered to recover a solids portion and a filtrate portion. The solids or filter cake portion was washed with ethyl acetate and dried. The dried filter cake and a sample of the filtrate portion were then separately subjected to an elemental analysis. The filtrate portion was subjected to further evaluation by distilling the filtrate in a batch distillation unit, distillation being terminated at a pot temperature of 750°F. at 3 mm. Hg pressure. The pot contents were labeled as "residue" and were submitted for elemental analysis. The distillate was identified with reference to its "average" distillation temperature (Avg. DT) which is an average of the overhead vapor temperatures recorded at 10 percent volumetric levels during the distillation, i.e. for distillate levels of 20, 30, 40, 50, 60 and 70 volume percent.

A detailed summary of the results obtained in Example VIII is set forth in Table XV.

TABLE XV

| | Liquid Stream from Reaction Vessel Total Slurry | Filtration of Liquid Stream from Reaction Vessel | | | | | | | | | Distillation of Filtrate | | | |
|---|---|---|---|---|---|---|---|---|---|---|---|---|---|---|
| | | Dry Cake Analysis | | | | Filtrate Analysis | | | | | | Residue | | |
| Sample Time, Hr. | Analysis % by Wt S | Amount % by Wt | % by Weight C | H | S | C/H Ratio | H | % by Weight N | O | S | Distillate Avg. DT °F. | Amount % by Wt. | C/H Ratio | Analysis % by Wt H | S |
| 25 | 0.09 | 3.68 | 48.38 | 2.56 | 1.03 | 10.09 | 8.93 | 0.33 | 1.39 | 0.05 | — | — | — | — | — |
| 30 | 0.11 | 5.03 | 42.12 | 2.70 | 1.06 | 10.73 | 8.29 | 0.37 | — | 0.06 | 56.05 | 6.2 | 15.01 | 6.11 | 0.06 |
| | | 4.36(a) | | | | | | | | | | | | | |

(a)Average per cent by weight of dry filter cake in the liquid stream from the reaction vessel based on 2 samples. This is equivalent to an ash-free lignite solvation of 97 percent.

It will be noted from the data in Tables XIV and XV that a significant amount of desulfurization was obtained by utilizing the process of the invention. The composited feed stream contained 0.39 per cent by weight of sulfur. The liquid stream from the reaction vessel after 30 hours of operation contained only 0.11 percent by weight of sulfur, most of which was in the solid (ash) phase. Upon filtration of the liquid stream from the reaction vessel, the filtrate contained even less sulfur, i.e., 0.06 percent by weight after 30 hours. The degree of lignite solvation was 97 percent.

EXAMPLE IX

In this Example, the procedure of Example VI was repeated except that the total catalyst was used to fill the entire lower half of the reactor and the feed was passed upwardly therethrough. The filtrate was analyzed at the end of 25 hours and was found to contain 0.04 per cent by weight of sulfur and 0.48 weight percent of nitrogen. The degree of coal solvation in this Example was 92 percent.

It can be seen, therefore, that the results obtained during the first 55-hour period of Example VI, in which the solvation was about 93 percent, was about as good as the results obtained in this Example. This is surprising. It would have been expected that in Example VI, representative of the process claimed herein, that because the reaction mixture is permitted to pass through substantially unobstructed passageways in its passage through the reaction zone a substantial amount of channelling would be obtained, desired reactions would be inhibited thereby and that both solvation and purification would suffer. However, as the data herein show, the desired results are still obtained. In fact, by operating as defined herein, an additional advantage is obtained, and that is plugging of the reactor with solids, whether they be from the solid carbonaceous material, from ash or from solids formed during the process, is minimized as a problem. We have carried out the procedure of this invention herein without any significant plugging whereas when the operation of this Example IX was continued for an additional 6 hours with a charge rate of 2.0 pounds of slurry per hour, the reactor plugged and operation ceased. We have also carried out our process as defined herein using the latter charge rate of 2.0 pounds per hour and have obtained results similar to those obtained in Example I without plugging.

EXAMPLE X

We have surprisingly found that while the desulfurization of this process is obtained when the charge to the reaction zone as this process contains an appreciable amount of solid materials, the same result is not obtained when the charge to be upgraded is carbonaceous but is liquid and carries with it no solid material. Thus, we have carried out three runs, whose data are summarized below in Table XVII, wherein a Kuwait Vacuum Bottoms (the residue obtained from the vacuum distillation of a Kuwait oil crude stock to remove lighter-boiling components therefrom) was subjected to different hydrogenation conditions. The Kuwait Vacuum Bottoms, a liquid but substantially free of solid material, analyzed as follows:

TABLE XVI

| Component | Weight Per Cent |
|---|---|
| Carbon | 83.75 |
| Hydrogen | 10.33 |
| Oxygen | 0.10 |
| Nitrogen | 0.39 |
| Sulfur | 5.43 |

In each of Runs Nos. 1 and 2, the catalyst used was identical to that used in Example I above. In Run No. 3, no catalyst was used but inert quartz chips were placed in the reactor as a solid bed. In Run No. 1, the catalyst was placed in the reactor to form a bed therein as in Example IX above, while in Run No. 1 the reaction zone arrangement was identical to that used in Example I above. No catalyst was used in Run No. 3. The results obtained are tabulated below in Table XVII.

TABLE XVII

| Run Number | 1 | 2 | 3 |
|---|---|---|---|
| Reaction Conditions | | | |
| Amount of catalyst in grams | 142 | 396 | None |
| Reactor size, diameter × height, inches | 1 × 38 | 3 × 18 | 1 × 38 |
| Pressure, psig | 2000 | 2000 | 2000 |
| Temperature, °F. | 750 | 750 | 750 |
| LHSV (volume of oil/ volume of catalyst/hr) | 0.5 | 0.5 | 0.5 |
| Hydrogen rate, std. cu. ft./barrel | 5000 | 5000 | 5000 |
| Run period, hours | 24 | 24 | 24 |

TABLE XVII-continued

| Run Number | 1 | 2 | 3 |
|---|---|---|---|
| Product Analysis | | | |
| Weight per cent Desulfurization | 91.9 | 74.8 | 12.3 |
| Weight per cent of Sulfur in product | 0.44 | 1.37 | 4.93 |

It will be noted that in this case, with a feed outside that defined herein, desulfurization in a fixed bed (Run No. 1) is more effective than when such desulfurization is operated otherwise using the procedure defined herein (Run No. 2). No determination was made in any of the runs of the nitrogen content of the treated product.

In further evaluation of the process of the invention, the liquid stream product removed from the top of the reaction vessel was subjected to distillation without prior removal of solids. It was found that the liquid stream from the reaction vessel could be fractionated in both atmospheric and vacuum towers continuously without prior removal of ash and unconverted coal. Despite the presence of solids, both atmospheric and vacuum distillation proceeded smoothly.

The advantages of operating in accordance with the process defined and claimed herein are many: operation can be carried out over extended periods of time without plugging, despite the severity of reaction conditions; production of surprisingly high quality products is obtained under the defined set of conditions; conversion of solid carbonaceous material can be controlled, for example, to produce a liquid product containing fractions of varying boiling points as well as a solid carbonaceous product having a lower melting point than the charge to the process; upon filtering, the ash content of the product can be greatly lowered; and impurities associatd with the solid carbonaceous material being treated, for example, sulfur, nitrogen, oxygen, etc., can be substantially reduced.

While our invention has been described with reference to various specific examples and embodiments, it will be understood that the invention is not limited to such examples and embodiments and may be variously practiced within the scope of the claims hereinafter made.

We claim:

1. A process for the conversion of solid carbonaceous materials containing less than about 50 weight per cent of solid inorganic compounds, which carbonaceous materials tend to produce coke during conversion, which comprises introducing a slurry composed of said solid carbonaceous material and a solvent having hydrogen transfer properties together with hydrogen into a reaction vessel comprising a plurality of closely-spaced reaction zones separated by porous partitions, a portion of said zones containing a solid particulate catalyst which will not pass through said porous partitions and the remainder of said zones forming substantially unobstructed passageways through said reaction vessel and passing slurry through said unobstructed passageways and through said porous partitions into contact with said catalyst under hydrogenation conditions, whereby hydrogenation of said carbonaceous materials takes place.

2. A process according to claim 1 wherein said reaction zones are substantially elongated and vertically disposed.

3. A process according to claim 1 wherein said reaction zones are substantially horizontally disposed.

4. A process according to claim 1 further characterized in that the ratio of the cross-sectional area of one catalyst zone to the total cross-sectional area of all catalyst zones is about 1:4 to about 1:10,000.

5. A process according to claim 1 wherein the volume proportion of substantially unobstructed passageways to catalyst is in the range of about 20:1 to about 1:10.

6. A process for the hydrogenation of solid carbonaceous material which comprises reducing said carbonaceous material to a fine state of subdivision; suspending the reduced solid carbonaceous material thus formed in a solvent having hydrogen transfer properties to form a slurry; and introducing said slurry together with hydrogen into a reaction vessel at a weight hourly space velocity between about 0.25 and about 40, said reaction vessel comprising a plurality of closely-spaced reaction zones separated by porous partitions, a portion of said zones containing a solid particulate hydrogenation catalyst which will not pass through said porous partitions and the remainder of said zones forming substantially unobstructed passageways through said reaction vessel, the volume proportion of substantially unobstructed passageways to catalyst zones being from about 20:1 to about 1:10, the reaction zones being maintained at a temperature between about 500° and about 900°F. and a pressure between about 500 to about 10,000 pounds per square inch gauge and passing slurry through said unobstructed passageways and through said porous partitions into contact with said catalyst, whereby hydrogenation of said carbonaceous materials takes place.

7. A process according to claim 6 wherein the solid carbonaceous material is selected from the group consisting of bituminous, subbituminous and lignite coals.

8. A process according to claim 7 wherein the coal is a Pittsburgh seam coal.

9. A process according to claim 7 wherein the coal is a Kentucky coal.

10. A process according to claim 7 wherein the coal is a Wyoming coal.

11. A process according to claim 6 wherein said reaction zones are substantially elongated and vertically disposed.

12. A process according to claim 6 wherein said reaction zones are substantially horizontally disposed.

13. A process according to claim 6 wherein the solvent is selected from the group consisting of liquids produced in the reaction vessel, anthracene, phenanthrene, naphthalene, chrysene, carbazole, tetralin and mixtures thereof alone and in combination with a phenolic compound selected from the group consisting of phenol and cresol.

14. A process according to claim 13 wherein the weight ratio of solvent to solid carbonaceous material is within the range of about 0.6:1 to about 4:1, solvent to solid carbonaceous material, respectively.

15. A process according to claim 13 wherein the weight ratio of solvent to solid carbonaceous material is within the range of about 1:1 to about 3:1, solvent to solid carbonaceous material, respectively.

16. A process according to claim 13 wherein the weight ratio of solvent to solid carbonaceous material is about 2:1, solvent to solid carbonaceous material, respectively.

17. A process according to claim 6 wherein the hydrogenation catalyst comprises at least one hydrogenating component selected from the group consisting of the metals, metal sulfides and/or metal oxides of (a) a combination of about 2 to about 25 per cent by weight molybdenum and at least two iron group metals based on the total weight of the catalyst where the iron group metals are present in such amounts that the atomic ratio of each iron group metal with respect to molybdenum is less than about 0.4 and (b) a combination of about 5 to about 40 per cent by weight of nickel and tungsten based on the total weight of the catalyst where the atomic ratio of tungsten to nickel is about 1:0.1 to 5, said hydrogenating component being composited with a porous support.

18. A process according to claim 17 wherein the hydrogenating component of the catalyst is a sulfided combination of molybdenum, nickel and cobalt.

19. A process according to claim 17 wherein the hydrogenating component of the catalyst is a sulfided combination of nickel and tungsten.

20. A process for the hydrogenation of a solid carbonaceous material selected from the group consisting of bituminous, subbituminous and lignite coals which comprises reducing said solid carbonaceous material to a fine state of subdivision such that at least 50 per cent of the reduced carbonaceous material will pass through a 40-mesh (U.S. Series) sieve; suspending the reduced carbonaceous material in anthracene oil to form a slurry wherein the weight ratio of anthracene oil to reduced carbonaceous material is within the range of about 0.6:1 to about 4:1 anthracene oil to carbonaceous material, respectively; passing said slurry together with hydrogen through a predigestion vessel at a volume hourly space velocity between about 0.1 and about 10.0, at a temperature of about 500° to about 900°F. and at a pressure within the range of about 100 to about 5000 pounds per square inch gauge, the rate of hydrogen addition being about 1000 to about 5000 standard cubic feet per barrel of slurry; and introducing the predigested slurry thus obtained together with hydrogen into a reaction vessel at a weight hourly space velocity between about 0.25 and about 40, said reaction vessel comprising a plurality of closely-spaced reaction zones separated by porous partitions, a portion of said zones containing a solid particulate hydrogenation catalyst which will not pass through said porous partitions and the remainder of said zones forming substantially unobstructed passageways through said reaction vessel, the volume proportion of substantially unobstructed passageways to catalyst zones being from about 20:1 to about 1:10, the reaction zones being maintained at a temperature between about 500° and about 900°F. and a pressure between about 500 and about 10,000 pounds per square inch gauge and passing slurry through said unobstructed passageways and through said porous partitions into contact with said catalyst whereby hydrogenation of said carbonaceous materials takes place.

21. A process according to claim 10 wherein said reaction zones are substantially elongated and vertically disposed.

22. A process according to claim 20 wherein said reaction zones are substantially horizontally disposed.

23. A process according to claim 20 further characterized in that the ratio of the cross-sectional area of one catalyst zone to the total cross-sectional area of all catalyst zones is about 1:4 to about 1:10,000.

24. A process according to claim 20 wherein the coal is a Pittsburgh seam coal.

25. A process according to claim 20 wherein the coal is a Kentucky coal.

26. A process according to claim 20 wherein the coal is a Wyoming coal.

27. A process according to claim 20 wherein the hydrogenation catalyst comprises at least one hydrogenating component selected from the group consisting of the metals, metal sulfides and/or metal oxides of (a) a combination of about 2 to about 25 per cent by weight molybdenum and at least two iron group metals based on the total weight of the catalyst where the iron group metals are present in such amounts that the atomic ratio of each iron group metal with respect to molybendum is less than about 0.4 and (b) a combination of about 5 to about 40 per cent by weight of nickel and tungsten based on the total weight of the catalyst where the atomic ratio of tungsten to nickel is about 1:0.1 to 5, said hydrogenating component being composited with a porous support.

28. A process according to claim 27 wherein the hydrogenating component of the catalyst is a sulfided combination of molybdenum, nickel and cobalt.

29. A process according to claim 27 wherein the hydrogenating component of the catalyst is a sulfided combination of nickel and tungsten.

* * * * *